United States Patent [19]
Cannon

[11] Patent Number: 5,559,950
[45] Date of Patent: Sep. 24, 1996

[54] GRAPHICS PROCESSOR ENHANCEMENT UNIT

[75] Inventor: Lee Cannon, Bozeman, Mont.

[73] Assignee: Video Lottery Technologies, Inc., Bozeman, Mont.

[21] Appl. No.: 191,019

[22] Filed: Feb. 2, 1994

[51] Int. Cl.$^6$ .................................................. G06F 15/00
[52] U.S. Cl. ...................................... 395/162; 395/164
[58] Field of Search ................................ 395/162–166, 395/152

[56] References Cited

U.S. PATENT DOCUMENTS

| | | | |
|---|---|---|---|
| 5,170,468 | 12/1992 | Shah | 395/166 |
| 5,254,984 | 10/1993 | Wakeland | 345/144 |
| 5,388,192 | 2/1995 | Ohsawa | 395/135 |

*Primary Examiner*—Mark R. Powell
*Assistant Examiner*—U. Chauhan

*Attorney, Agent, or Firm*—Kokjer, Kircher, Bowman & Johnson

[57] ABSTRACT

A graphics processor enhancement system having a processor connected through data and lower address lines to two areas of random access memory (RAM). One area of RAM stores an image frame and the other area of RAM stores a copy of a background section of the image frame. The processor is connected through a read/write line and higher address lines to a programmable logic device (PLD), the output of which functions to enable one of the two areas of RAM. The system also stores a transparent memory map containing a copy of the object surrounded by transparent pixel values. The processor provides an animated display by modifying a portion of the image frame, such that an object stored therein is incremental moved across the image frame. The PLD enables the processor to read the copied background section, overlay this background section with the transparent memory map and write the resulting combination to the image frame over the old object stored therein. The resulting image frame includes the object at a new location.

21 Claims, 5 Drawing Sheets

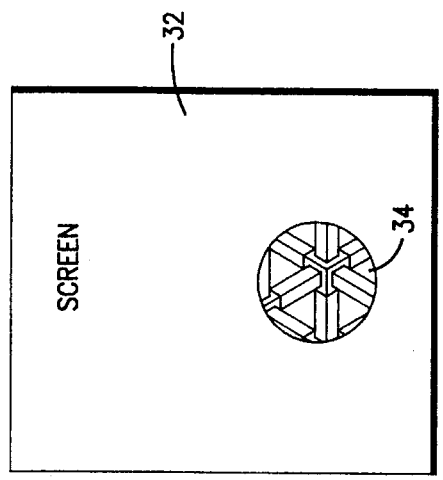
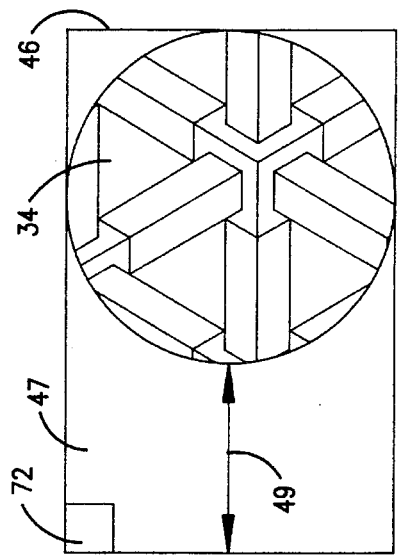
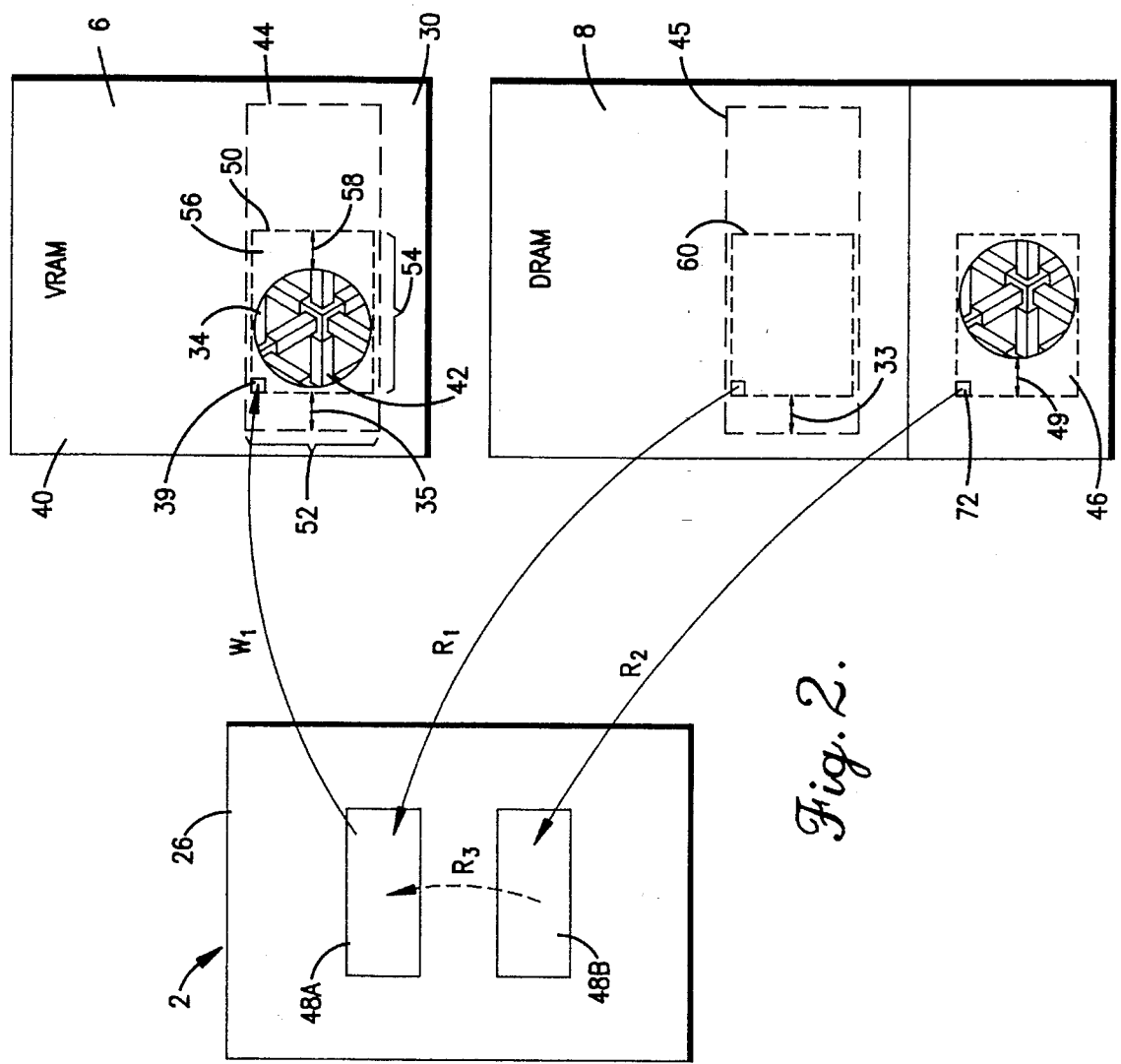
Fig. 4.
Fig. 2.

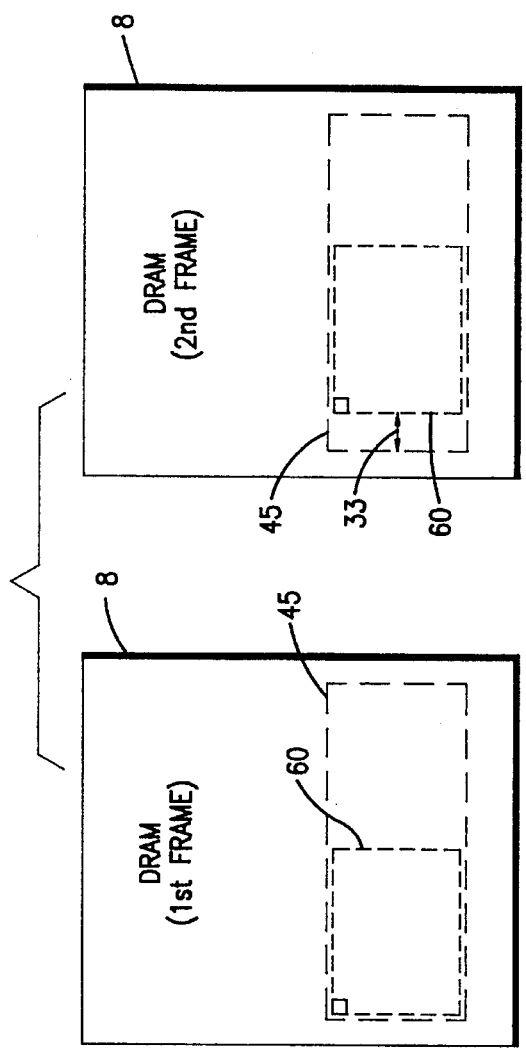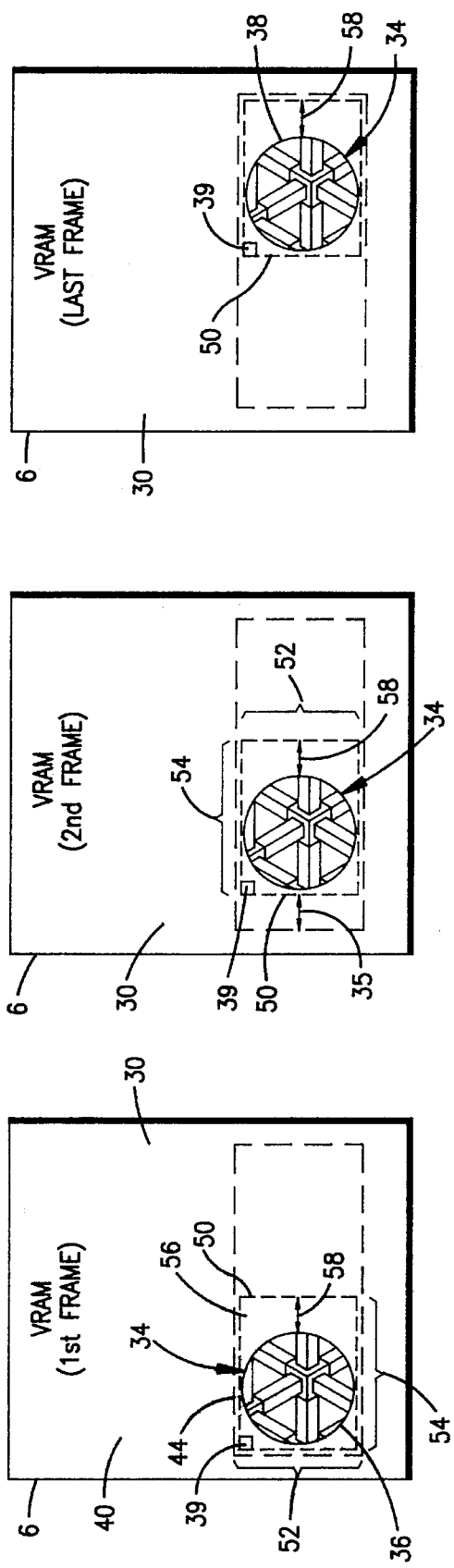

GRAPHICS PROCESSOR ENHANCEMENT UNIT

BACKGROUND OF THE INVENTION

1. Field of the Invention

The present invention relates in general to a graphics processor system, and in particular, to an enhancement in the operating sequence used to display moving images on a video screen.

2. Description of the Related Art

Generally, a graphics processor is a special purpose microprocessor specifically designed to generate signals to drive a video monitor. Graphics processors include a hardware architecture and programming instructions designed specifically to perform specialized tasks associated with video graphics. As with microprocessors and other complex circuits with large consumer demands, graphics processors are produced as large scale integrated circuits. Very significant tooling costs are involved to convert a design to a large scale integrated circuit, but the result is the ability to produce parts with very significant advantages in terms of size, cost, and reliability compared to producing circuits with less complex, non-specialized components.

However, design enhancements, whether conceived by the graphics processor manufacturer or by a potential user, are not readily incorporated since the circuitry is imbedded in the silicon of the large scale integrated circuit and such a change requires major tooling cost to modify. As such, a user generally must live with the graphics processor architecture as provided by the manufacturer.

Typically, a GSP operates a VRAM module (video random access memory) which stores at least one image frame corresponding to one image displayed on the CRT monitor. Each image is formed from an array of colored pixels (e.g., 512 pixels per row and 384 pixels per column), the color for each pixel being defined by a corresponding data value stored in the related VRAM frame. The number of bits assigned to each pixel depends upon the number of possible colors that can be displayed. For example, an 8-bit data value per pixel will allow 256 different colors to be defined at each pixel.

To display an image stored in a frame in the VRAM, the image data is serially output to the CRT monitor. In this manner, consecutive data values are provided directly to the CRT monitor at high speed, without passing through the GSP. The CRT monitor illuminates each pixel to the correct color by using one or more electron beams to scan the screen in a raster pattern. While performing the raster scan, the electron beams scan horizontally across each row of pixels. At the end of a row, each beam moves vertically down one row and repeats the horizontal motion. Each beam repeats this process until it reaches the last pixel in the bottom row of the screen, at which time the beams return to the first pixel in the top row and prepare to repeat the raster scan. Each scan of the screen corresponds to one frame in the VRAM.

While the CRT monitor reads one image frame of data from the VRAM, the GSP updates the VRAM's image frame to correspond to the next image to be displayed. When the CRT monitor reads the next image frame, it will be somewhat different from the preceding image. Thus, to provide an animated graphics image, the GSP continuously modifies the image frame between each raster scan by the CRT.

To modify an image frame in the VRAM, the GSP performs a read-modify-write operation. More directly, the GSP reads the original image from the VRAM, modifies the image and writes the modified image back to the VRAM. The GSP may add images, such as icons, to the image frame in the VRAM. To support a variety of visual effects, such as animated movement of an icon across a screen, the GSP allows logical or arithmetic operations to be performed upon the original image. One form of animation is to display an image/icon on a constant graphics background and cause the icon to traverse the screen. The icon is incrementally moved small distances between each image frame to move from a starting point to a stopping point.

In the past, to achieve this animated motion, the GSP initially "created" a background image throughout the image frame of the VRAM. Next, the GSP added the icon by writing it into the image frame over a first segment of the background image, corresponding to the icon's starting position. To "move" the icon, the GSP consecutively rewrote the icon image to new segments of the image frame, each new segment corresponding to the second, third, fourth, etc. positions of the icon on the screen. As the icon moved, the GSP created the impression that the icon "uncovered" part of the background image. To do so, the GSP rewrote the background image to the addresses in the VRAM that the icon "moved" away from or "uncovered."

However, conventional GSPs are unable to recreate quickly these background segments. Accordingly, after creating the entire background, but before writing the icon in a starting segment of the VRAM, the GSP copies a section of the background to a new memory area, referred to as scratch memory. The copied background section could be (1) a single segment over which the icon will be written in the next image frame or (2) an entire area over which the icon will traverse during all subsequent image frames. Next, the icon is written in the VRAM at its starting point. To advance the icon, the copied background section in the scratch memory is written over the icon in the VRAM and the icon is written at its next location in the VRAM.

However, if the GSP uses the former copying method, then after writing the copied background section to the VRAM, but before writing the icon to its new location, the GSP must copy the next background section over which the icon will be written. The copying operation must be repeated before writing the icon to each subsequent location to ensure that a copy of the "covered" and "uncovered" background sections is maintained in the scratch memory.

Further, if the GSP uses the latter copying method, it must use enough scratch memory to hold the entire background section that will be traversed. Also, the GSP must rewrite the entire copied background section to the VRAM, which may be quite large, between each incremental move of the icon. Under either conventional method, the use of scratch memory and the requirement for multiple read/write operations add to the processing time and slow the animation speed.

Delaying the processing time creates problems when displaying the image, such as "fluttering" and "tearing."

A tearing appearance results when the GSP is unable to update the VRAM completely between two consecutive raster scans. When this occurs, the CRT may read and display a portion of the VRAM which has been updated by the GSP to correspond to the next image frame, and a portion of the VRAM which has not been updated. As the CRT crosses between the updated and non-updated portions of the VRAM, it displays part of an icon in its new position and part of the icon in its old position. Accordingly, the icon appears to be "tearing" along the border between new and old icon positions, which is undesirable.

A fluttering appearance results when the CRT reads the VRAM after the copied background section has been rewritten to the VRAM, but before the icon has been written to its new location. When this occurs, the CRT will display an image frame entirely void of an icon, thereby creating the appearance that the icon is fluttering. The fluttering effect may be removed by synchronizing the GSP with the vertical sync signal whereby the CRT only refreshes the screen after the icon has been written to its new location. However, this synchronization further reduces the animation speed.

SUMMARY OF THE INVENTION

An object of the present invention is to provide an enhanced graphics processing system with an existing graphics system processor architecture.

A further object of the present invention is to increase the animation speed of, and to provide a smooth animation effect, from the GSP system.

Another object of the present invention is to enable a GSP processor to update a frame in VRAM with one read-modify-write operation.

Another object of the present invention is to enable a GSP processor to perform read-modify-write operations between two source address and one destination address with a single operation.

These and other objects are achieved by a graphics processor enhancement system having a processor connected through data and lower address lines to two areas of random access memory (RAM). One area of RAM stores an image frame and the other area of RAM stores a copy of a background section of the image frame. The processor is connected through a read/write line and higher address lines to a programmable logic device (PLD), the output of which functions to enable one of the two areas of RAM. The system also stores a transparent memory map containing a copy of the object surrounded by transparent pixel values. The processor provides an animated display by modifying a portion of the image frame, such that an object stored therein is incremental moved across the image frame. The PLD enables the processor to read the copied background section, overlay this background section with the transparent memory map and write the resulting combination to the image frame over the old object stored therein. The resulting image frame includes the object at a new location.

BRIEF DESCRIPTION OF THE DRAWINGS

The objects and features of the invention noted above are explained in more detail with reference to the drawings, in which like reference numerals denote like elements, and in which:

FIG. 2 is a block diagram of the memory maps and mapping sequences used by the present invention during a read-modify-write operation;

FIG. 3 is a block diagram illustrating the memory map in the DRAM with respect to two consecutive image frames which store the background image copy;

FIG. 4 is a detailed view of a transparency memory map containing the object surrounded by transparency pixel values;

FIG. 5 is a block diagram illustrating the memory map in the VRAM with respect to two consecutive image frames, corresponding to the image frames of FIG. 4, and a final image frame;

DETAILED DESCRIPTION OF THE INVENTION

Figure 1:
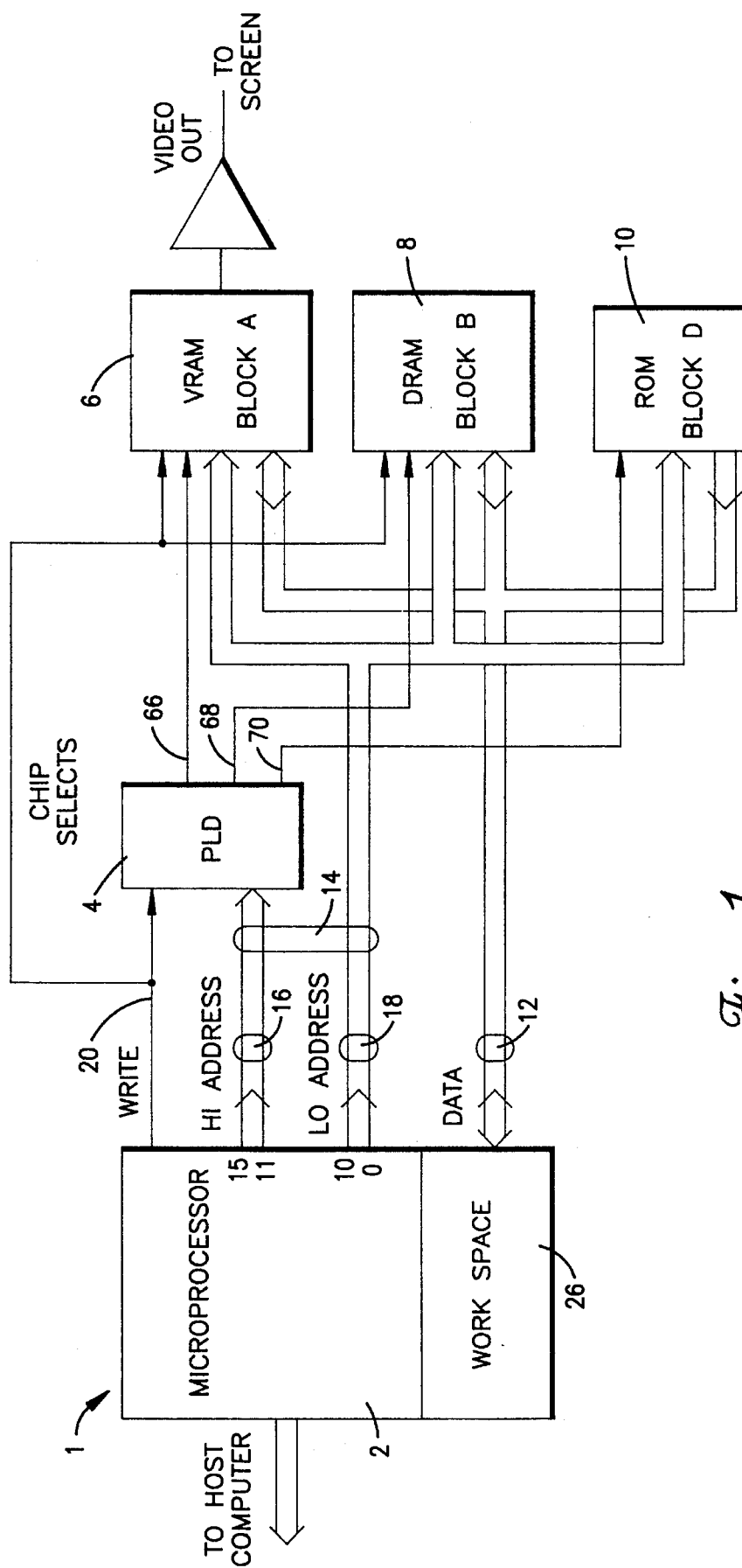
FIG. 1 is a block diagram of a graphics processing system according to the present invention.

FIG. 1 illustrates the architecture of the present invention, which is generally designated as reference numeral 1. The present system includes a graphics processor 2 which is connected to a programmable logic device (PLD) 4, a video random access memory (VRAM) module 6, a dynamic random access memory (DRAM) module 8, and a read only memory (ROM) 10.

A variety of processors may used, such as the graphics system processor (GSP) TMS34010 by Texas Instruments. In the preferred embodiment, the GSP is a 32-bit microprocessor which offers interfacing to conventional DRAM and VRAM modules, automatic CRT display refresh and direct communication with an external (host) processor. The graphics processor 2 performs all reading and writing operations to and from the VRAM 6 and DRAM 8. The 32-bit architecture enables the processor to transmit large blocks of continuously-addressable memory as is necessary in graphics applications. The processor 2 includes first and second on-board workspace registers 48A and 48B which store temporarily data values read from the VRAM and/or DRAM. The GSP includes a multitude of general purpose instructions, as well as graphics functions, that facilitate the programming of high-level animation functions. The instructions support arithmetic and Boolean operations, data moves, conditional jumps, subroutine calls, returns and the like.

The graphics processor 2 communicates with the VRAM 6, DRAM 8 and ROM 10 via a data bus 12 and an address bus 14. The data and address buses 12 and 14 may be formed as 8-bit, 16-bit or 32-bit buses depending upon the capacity of the graphics processor, VRAM and DRAM. The address bus 14 is segmented into higher and lower address lines 16 and 18, respectively. The lower address lines 18 communicate directly with each of the VRAM 6, DRAM 8, and ROM 10. The higher address lines 16 communicate with the PLD 4.

The higher and lower address lines 16 and 18 typically will not include the same number of lines. FIG. 1 illustrates, by way of example only, the use of lines 0–10 for the lower address lines 18 and the use of address lines 11–15 for the higher address lines 16. It is only necessary that the lower segment include enough address lines to access every address within the image frame stored in the VRAM 6 and DRAM 8.

A read-write (R/W) line 20 is output by the graphics processor 2 to distinguish between read and write operations. The R/W line 20 is connected directly to the PLD 4, VRAM 6, and DRAM 8. The PLD 4 outputs three chip select signals 66, 68, and 70, which enable and disable the VRAM 6, DRAM 8 and ROM 10, based on the values upon the R/W line 20 and higher address lines 16.

The ROM 10 contains data and software which control the graphics processor 2. The ROM 10 is also referred to hereafter as memory Block D.

The VRAM 6 stores at least one frame of image information to be displayed on the screen 32 (FIG. 2) (i.e., a data value for each pixel on the screen). The VRAM 6 stores the image frame in an array, also referred to as a memory map 30 (FIG. 5). Each data value identifies the color of a corresponding pixel on the screen 32. As illustrated in FIG. 2, each data value within the memory map 30 corresponds to a background image pixel 40 or an object image pixel 42 on the screen 32. The processor 2 defines an animation area 44 within the memory map 30. The animation area 44 encompasses an entire region of the background image, over which the object 34 (also referred to as an icon or sprite) will ultimately travel during an animation sequence. The graphics processor 2 further defines an image shadow mask 50 surrounding the object 34 and within the animation area 44. The image shadow mask 50 represents the region of the animation area 44 that will be rewritten between consecutive image frames in order to move the object 34. The processor 2 continuously moves and updates the mask 50 to provide animated movement of an object 34.

As illustrated in FIG. 5, the object 34 and image shadow mask 50 are moved from a starting position 36 to an ending position 38. The animation area 44 is formed as a slim rectangle having a width substantially equal to or slightly greater than the width of the object 34 and a length equal to the area over which the object 34 travels. The animation area 44 and image shadow mask 50 will vary in shape depending upon the shape and path of motion of the object. For instance, if the object 34 moved diagonally from the lower left corner to the upper right corner of the screen 32, the animation area 44 would resemble a rectangle oriented at a diagonal along this path.

Referring to FIG. 2, the DRAM 8 stores a copy of a section of the background image from the memory map 30. While the DRAM 8 may store the entire background image, it is only necessary that the DRAM 8 copy that section of the background image corresponding to the animation area 44. In the preferred embodiment, the processor 2 is configured to store the copied animation area 45 within the DRAM 8 at the same addressing space as the animation area 44 is stored within the VRAM 6. By way of example only, assume that the memory map 30 stores an image frame at a memory block referred to as Block A. Further assume that Block A is located between addresses 0000 0000 and FFFF FFFF. Accordingly, the DRAM 8 is configured to include a memory block, referred to as Block B, located between addresses 0000 0000 and FFFF FFFF. When the animation area 44 is written to the copied animation area 45, the VRAM 6 and DRAM 8 are mapped in a one-to-one relation, such that each data value in the animation area 44 is stored at the same address in the DRAM 8 (Block B). When the processor 2 outputs an address to the VRAM 6 and DRAM 8, the PLD 4 controls the chip enable lines 66 and 68 to direct the address to the correct memory module, thereby distinguishing between Blocks A and B.

Table 1, as set forth hereafter, illustrates the process by which the PLD 4 controls the status (i.e., disable or enable) of the chip select lines 66, 68 and 70. The higher address lines 16 are used by the processor 2 to distinguish between at least four separate blocks of data (A–D).

TABLE 1

| | | (PLD Outputs) | | |
| --- | --- | --- | --- | --- |
| R/W line | Higher Address lines | VRAM Chip Select | DRAM Chip Select | ROM Chip Select |
| X | BLOCK A | ENABLE | DISABLE | DISABLE |
| X | BLOCK B | DISABLE | ENABLE | DISABLE |
| READ | BLOCK C | DISABLE | ENABLE | DISABLE |
| WRITE | BLOCK C | ENABLE | DISABLE | DISABLE |
| X | BLOCK D | DISABLE | DISABLE | ENABLE |

As illustrated in Table 1, when the processor 2 addresses Blocks A, B and D, the PLD 4 enables the VRAM, DRAM and ROM, respectively, regardless of the status of the R/W line 20. Table 1 also indicates that the higher address lines 16 may refer to a Block C, that has not heretofore been mentioned. While Blocks A, B, and D represent physically distinct segments of memory, Block C does not. Instead, Block C represents a "virtual" segment of memory which the processor 2 operates upon and treates as if it were a physically distinct memory area. In fact, the processor 2 performs the majority of its reading and writing operations to the virtual Block C when animating an object. However, as illustrated in Table 1, when the processor 2 attempts to READ from the virtual Block C, the PLD 4 enables the DRAM 8 thereby accessing Block B. When the processor 2 attempts to WRITE to the virtual Block C, the PLD 4 enables the VRAM 6 thereby accessing Block A. The PLD 4 controls the chip enable lines 66, 68 and 70, as noted above, to control the transfer of image data between the processor and the VRAM 6 and the DRAM 8.

In other words, the PLD 4 deceives the processor 2 into believing that a separate block of memory exists for virtual Block C when, in reality, it corresponds to Block A, during writing operations, and it corresponds to Block B, during reading operations. The virtual Block C is used to enhance the operation of the graphics processor 2 as explained below.

Referring to FIG. 2, the processor 2 includes workspace registers 48A and 48B which receive image data values from, and transmit image data values to, the VRAM 6 and the DRAM 8. The processor 2 performs any necessary arithmetic and logical operations upon the image data while in the workspace registers 48.

Referring to FIGS. 2 and 4, the DRAM 8 further includes a transparency memory map 46 that stores an "object transparency," in which a source object 34 is defined by storing object data values in a desired pattern. The addresses surrounding the source object 34 store a predefined common data value referred as a transparent pixel value 47. The transparency memory map 46 remains unchanged throughout operation. The processor 2 utilizes the workspace registers 48 and transparency memory map 46 during read-modify-write operations to achieve an animated display.

The transparency memory map 46 is large enough to store the object 34 followed by a trailing section 49 of transparent pixel values 47. The width of the trailing section 49 equals the incremental distance that the object 34 is moved between two consecutive image frames. The trailing region 49 is positioned in the transparency memory map 46 relative to the object 34 based on the direction in which the object 34 moves during animation. For instance, if the object 34 is moved from left to right by ten pixels on the screen 32 between consecutive image frames, the trailing region 49 would be positioned as in FIG. 4, on the left or trailing side of the object 34. Also, the trailing region 49 would have a width of ten pixels or memory addresses. The purpose of the trailing region 49 and the transparent pixel values 47 are explained in greater detail below.

FIG. 5 illustrates three frames of the memory map 30, the first and third of which show the object 34 at starting and ending positions 36 and 38. The second frame immediately follows the first, whereby the object 34 has been moved one incremental distance 35. Each frame exhibits the animation area 44, which is not visible to the viewer and maintains a fixed position. Each frame further includes a shadow mask 50 surrounding the object 34, with a height 52 and width 54. The shadow mask 50 represents a region of the image that the processor 2 will modify between two consecutive image frames to move the object 34 by the incremental distance 35. As illustrated in FIG. 5, the shadow mask 50 adjoins the boundary of the object 34 on three sides, but projects beyond the object 34 on a fourth side 56 to form a leading portion 58. The leading portion 58 has a width equal to the incremental distance 35, and is positioned relative to the object 34 dependent upon the object's direction of movement. Thus, if the object 34 is moved from left to right (as in FIG. 5) by ten pixels, the leading portion 58 is placed in front of the object 34, with a width of ten pixels.

FIG. 3 illustrates two frames of the Block B in the DRAM 8, which correspond to the first and second frames of the image. Throughout operation, the Block B includes the same data within the copied animation area 45 for every image frame. A slightly different region of the copied animation area 45 is defined as the background shadow mask 60 for each image frame. The background shadow mask 60 defines the portion of the copied animation area 44 that is read from the DRAM 8 and partially written over the image shadow mask 50 in the VRAM 6 between consecutive image frames. The background shadow mask 60 is moved between consecutive image frames to track the motion of the image shadow mask 50. Hence, the background shadow mask 60 is moved by a distance 33, between the first and second frames, which equals the distance 35 moved by the object 34 between the first two image frames. As explained below, the processor 2 re-defines and re-reads the shadow mask 60 between each image frame when updating the object 34 on the screen 32.

Figure 6:
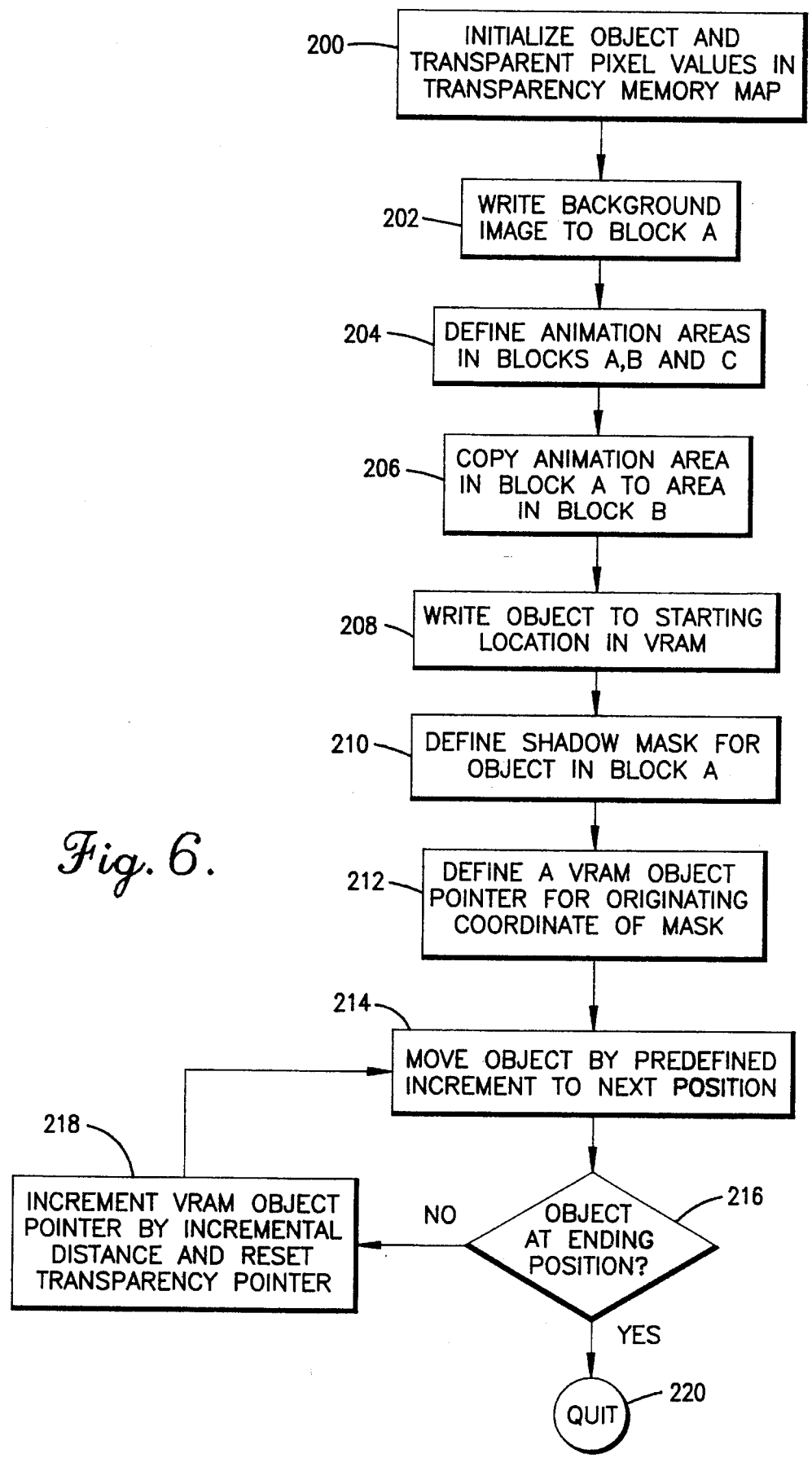
FIG. 6 is a flowchart illustrating the overall processing sequence performed by the present invention to display an animated object.

FIG. 6 illustrates the processing sequence by which the processor 2 animates an object upon the screen 32. First, the processor 2 initializes (step 200) the source object 34 and the transparent pixel values 47 within the transparency memory map 46 (as illustrated in FIG. 4). Next, the processor 2 writes the pixels 47 for the background image to Block A (step 202). Then, the processor 2 defines (step 204) the animation areas within Blocks A, B and C, based on the object's shape and the direction in which the object 34 is to be moved. As explained above, the processor 2 views Blocks A, B and C as separate blocks of addressable memory. However, the PLD 4 controls the chip select lines 66 and 68, to provide two physically separate blocks of memory, Blocks A and B, and one virtual block of memory, Block C. Therefore, when the processor 2 "defines" the animation area within Block C, this area physically over-laps the animation area 44 within Block A and the copied animation area 45 within Block B.

Then, the processor 2 sequentially copies each data value from the background image within the animation area 44 from Block A to the copied animation area 45 within Block B (step 206). As explained above, the VRAM and DRAM modules 6 and 8 are configured to use the same addressable memory locations in the preferred embodiment. Thus, the processor 2 transmits, over the lower address lines 18, the same addresses when reading the background image from the animation area 44 and when writing the background image to the copied animation area 45. The processor 2 discerns between Blocks A and B by changing the higher address lines 16. In response thereto, the PLD 4 changes the chip enable lines 66 and 68 according to Table 1.

Next, the processor 2 writes (step 208) the object 34 to a starting location 36 (see 1st Frame in FIG. 5) in the VRAM (Block A). Then, the processor 2 defines (step 210) the object and background shadow masks 50 and 60 including the height 52 and width 54 thereof. The shadow mask 50 is the section of the memory map 30 to be updated between consecutive image frames. Thereafter, the processor 2 defines a VRAM object pointer 39 identifying an originating address or coordinate of the shadow mask 50 (step 212). The VRAM object pointer 39 is used to keep track of the position of the object 34 and the shadow mask 50 in order to accomplish movement of the object 34.

At this point the processor 2 is ready to begin animation by updating (step 214) the VRAM 6 and moving the object 34 by a predefined incremental distance 35 across the screen 32 to the object's next position. To move the object 34, the processor 2 performs multiple read-modify-write operations (as explained below in connection with FIG. 7). After each incremental shift in the position of the object 34, the processor 2 updates the VRAM object pointer 39 to point to the new beginning coordinate of the shadow mask 50 and the object 34 (step 218). The need for this update is illustrated in FIG. 5. In the first frame, the VRAM object pointer 39 points to the upper left corner of the animation area 44. However, once the processor 2 moves the object 34, as in the second frame, this pointer no longer accurately reflects the object's position. Thus, the VRAM object pointer 39 is incremental by the predefined incremental distance 35 moved by the object 34. The shadow mask 50 is based on this pointer, and thus, the shadow mask 50 is also moved to the position in the second frame. Finally, in step 216, once the object 34 reaches the ending position 38 (FIG. 5), the processor 2 exits (step 220) the animation sequence.

Figure 7:
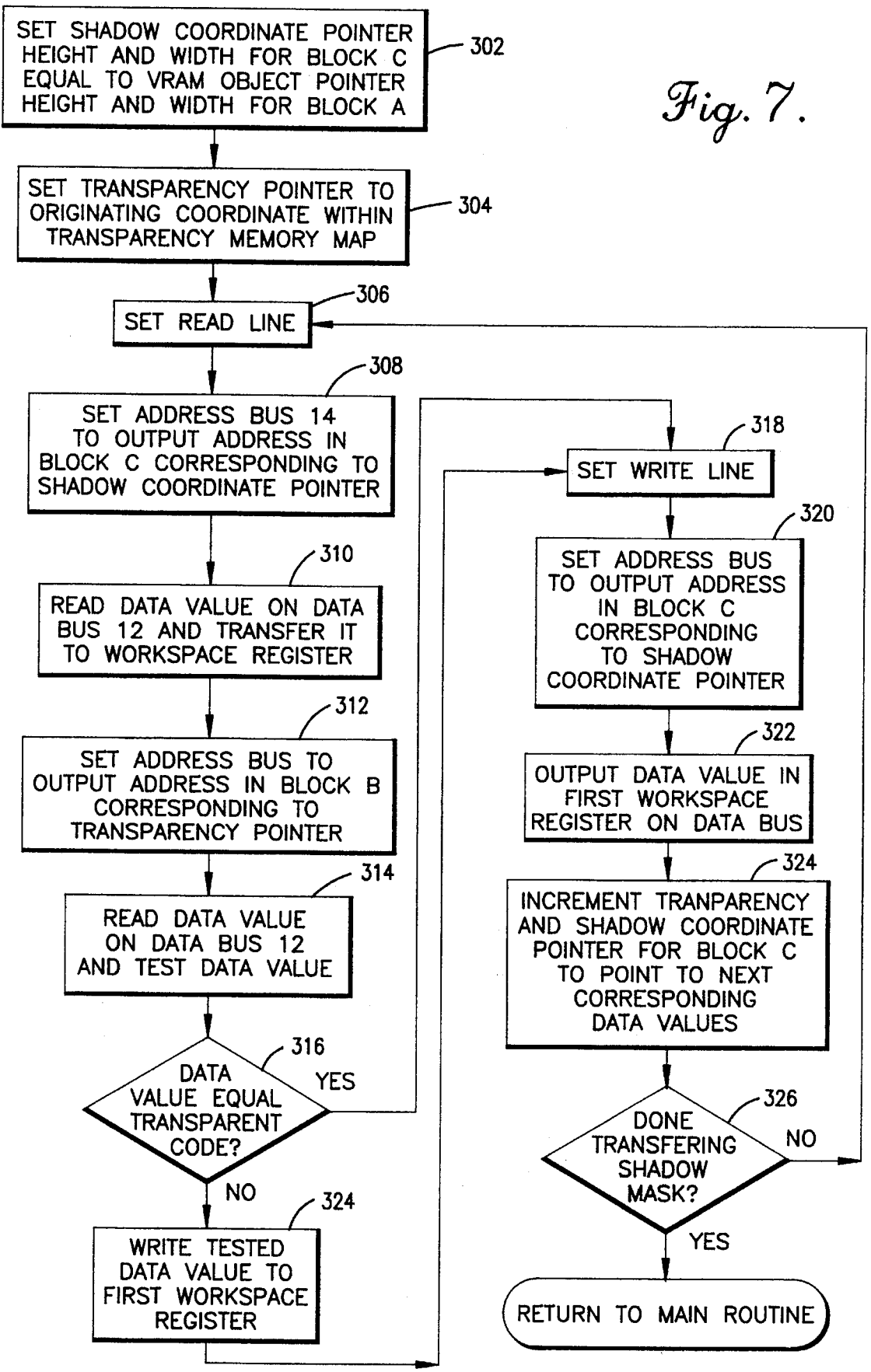
FIG. 7 is a flowchart illustrating the processing sequence performed by the present invention during a read-modify-write operation to update the object between consecutive image frames in accordance with the block diagraphm of FIG. 2.

FIG. 7 illustrates the operating sequence, by which the processor 2 moves the object 34 by one predefined increment 35 between adjacent image frames. To accomplish this movement, the processor 2 performs a series of read-modify-write operations to update each data value within the shadow mask 50 of the VRAM 6 (which corresponds to a "virtual" shadow mask of Block C). During each read-modify-write operation, the processor 2 updates one data value within the shadow mask 50. As noted above, when the object 34 moves across the animation area 44, the shadow mask 50 is moved by updating the VRAM object pointer 39 to the new beginning coordinate of the shadow mask 50 following each image frame update.

To read a single data value, the processor 2 first sets the beginning coordinate pointer, height and width of the virtual shadow mask for Block C (step 302) equal to the VRAM object pointer 39, height 52 and width 54, respectively, of the shadow mask 50 in the VRAM (Block A). When the object 34 is positioned at its starting position 36, the beginning coordinate of the shadow mask in Block C is the same as the beginning coordinate of the animation area 44 in Block A and the copied animation area 45 in Block B. These coordinates correspond to one another since Blocks A and B are mapped into the same addressing space of the VRAM and DRAM and since the virtual Block C overlaps the physical Blocks A and B. Then, the processor 2 sets a transparency pointer 72 to the originating coordinate within the transparency memory map 46 (step 304).

Next, the processor 2 sets the R/W line 20 to a READ status (step 306) and the address bus 14 to designate the beginning address in a virtual animation area of Block C (step 308). This beginning address is based on the beginning coordinate pointer for Block C. Specifically, the lower address lines 18, identifying an address in the virtual animation area, are transmitted directly to the VRAM 6 and DRAM 8. The higher address lines 16, identifying Block C, are transmitted to the PLD 4. In response to the R/W line 20 and the higher address lines 16, the PLD 4 sets the chip select line 68 to enable the DRAM 8 (in accordance with Table 1). The DRAM 8 outputs the data value stored at the designated address within the copied animation area 45 (as illustrated by line R1 in FIG. 2). This data value corresponds to the background image copied to the DRAM 8. The processor 2 reads the data value from the DRAM 8 and transfers it to the first workspace register 48A (step 310).

Next, the processor 2 reads a corresponding data value from the transparency memory map 46 (as illustrated by line R2 in FIG. 2). To do so, the processor 2 sets the lower address lines 18 to output an address in Block B corresponding to the transparency pointer 72 (step 312). The higher address lines 16 are set to designate Block B. The PLD 4 identifies that the R/W line 20 is in a READ status and the higher address lines designate Block B. The PLD 4 enables chip select line 68 and the DRAM 8 outputs, onto the data bus 12, a data value from the corresponding address in the transparency memory map 46. The processor 2 reads the data value on the data bus 12 (step 314), stores it in the second workspace register 48B and tests this data value to determine whether it corresponds to a transparency code (e.g., "0") (step 316).

If the data value equals the transparency code, the processor 2 concludes that the data value read from virtual Block C and stored in the first workspace register 48A should not be modified. Accordingly, the processor 2 returns the data value in the first workspace register 48A to virtual Block C, by setting the R/W line 20 to a WRITE status (step 318). Next, the processor 2 resets the lower address lines 18 to correspond to the coordinate pointer for Block C (step 320). Also, the processor 2 sets the higher address lines 16 to identify Block C (step 320). The PLD 4, in accordance with Table 1, enables the chip select line 66 for the VRAM 6 when the WRITE status is set and Block C is addressed. Then, the processor 2 outputs the data value from the first workspace register 48A onto the data bus 12 (step 322). Accordingly, data value in the first workspace register 48A is written to the corresponding address in the VRAM 6 (as illustrated in FIG. 2 by line W1).

Referring back to step 316, if the processor 2 determines that the data value in the second workspace register 48B read from the transparency memory map 46 does not correspond to a transparency code, then operation proceeds to step 324. Here, the processor 2 concludes that the data value in the first workspace register 48A should be modified. Accordingly, the processor 2 writes the tested data value from the second workspace register 48B to the first workspace register 48A (as illustrated by dashed line R3 in FIG. 2). Thereafter, operation proceeds along steps 318–322 as explained above.

At step 324, the processor 2 increments the transparency pointer 72 to the transparency memory map 46 and the shadow coordinate pointer to Block C to point to the next data values therein. These pointers are updated based on the shape of the shadow mask 50 which corresponds to the shape and size of the transparency memory map 46. Once these pointers are updated, the processor 2 determines whether the shadow mask 50 has been completely updated based on the new position of the pointers (step 326). If so, the processor 2 returns to the main routine at step 216. If not, the processor 2 returns to step 306 in the read-modify-write subroutine and repeats the above process.

Steps 302–324 allow the processor 2 to operate in accordance with a manner, for which it is designed. The processor 2 believes that it is reading a data value from Block C, modifying that data value when appropriate, and writing the data value back to the original address in Block C. In reality, the PLD 4 controls the chip select lines 66 and 68, such that the processor 2 reads a background data value from Block B in DRAM 8 and modifies it to an object data value when dictated by the data value read from the transparency memory map 46. Thereafter, the processor 4 writes the background or object data value to Block A in the VRAM 6.

The following discussion is intended to conceptually explain the end result of the above processing sequence. When referring to FIGS. 2–5, it is assumed that the object 34 is oriented at the starting position 36 within the memory map 30 (FIG. 5, first frame). When the processor 2 moves the object 34 from its starting position 36, a read-modify-right operation is performed upon every data value within the shadow mask 50. The processor 2 reads the background shadow mask 60, as defined within the first image frame, of the DRAM 8 (FIG. 3) and writes this background image over the shadow mask 50 within the memory map 30. Simultaneously, the processor 2 overlays the transparency memory map 46 upon the background shadow mask 60 as it is positioned within the memory map 30. The transparency memory map 46, background shadow mask 60 and shadow mask 50 have identical dimensions, and thus, exactly overlap. A comparison of the shadow mask 50 and the transparency memory map 46 will illustrate that the object 34 is positioned at opposite sides of these masks. Particularly, within the shadow mask 50 the object 34 is preceded by a leading regioned 58. In contrast, the object 34 in the transparency memory map 46 is followed by a trailing region 49. By orienting the object 34 in this manner, when the transparency map 48 overlaps the image shadow mask 50, the resulting object 34 has moved forward by a distance equalling the trailing region 49. Thus, the processor 2 is able to move the object 34 simply by writing the transparency memory map 46 over the image shadow mask 50.

As explained above, the transparent pixel values within the transparency memory map 46 are not actually written into the memory map 30. Instead, the background image from the background shadow mask 60 is written into the shadow mask 50. The background shadow mask 60 is used to insure that the trailing region 49 does not include part of the object 34 from a previous frame. Conceptually, the object 34 from the transparency memory map 46 is laid over the background shadow mask 60, and the combination thereof is written over the image shadow mask 50 within the memory map 30. In this matter, the processor 2 is able to update the object 34 in a single series of read-modify-write operations.

From the foregoing it will be seen that this invention is one well adapted to attain all ends and objects hereinabove set forth together with the other advantages which are obvious and which are inherent to the structure.

Optionally, the instant invention may be implemented using memory modules other than VRAM and DRAM modules, for instance SRAM modules. Depending upon the architecture of the graphics processor, any form of RAM may be used (e.g., static RAM), so long as two areas of RAM exist, one of which contains the frame to be displayed upon the screen 32 and one of which contains a clean or object-free copy of the background image. Generally, these two areas of RAM will be implemented within separate components, thereby allowing the selection of each area of RAM to be implemented through the chip select signals.

However, optionally, the instant invention could be implemented using a single memory component, having two separate areas of RAM with the PLD 4 outputting the higher address lines. In this alternative embodiment, the separate areas of RAM would be selected by the PLD 4 through manipulating the higher address lines, instead of the chip select lines. In this alternative embodiment, the two separate areas of RAM may be addressable with different lower address lines, while the higher address lines are used to distinguish between the areas. The PLD would perform all addressing operations.

Optionally, the regions of the VRAM and DRAM containing the animation area and the copy thereof, need not be stored in the same addressing space. In this instance, all of the addressing lines would be input to, and output from, the PLD. The PLD would read the desired input address and the status of the read/write line. The PLD would determine when the processor was attempting to read or write a particular address within the virtual memory block C and would output the corresponding address within the VRAM or DRAM. Hence, the animation areas within the VRAM and DRAM need not be located in the same addressing space.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings 1–7 is to be interpreted as illustrative, and not in a limiting sense.

What is claimed is:

1. A system for displaying an animated object upon a background on a screen, the object being moved between consecutive image frames, said system comprising:

a data bus;

a virtual memory area, connected to said data bus, said virtual memory area including first and second memory areas, said first memory area storing a memory map corresponding to an image frame, said memory map storing object and background data defining an object and background displayed in said image frame, said second memory area storing a copy of background data located within an animation area in said first memory area, said animation area corresponding to a portion of said background through which said object moves during animation;

a screen for displaying said image frame;

processor means, connected to said data bus, for accessing said object and background data during read and write operations, respectively, to said virtual memory area to move said object between consecutive image frames;

an address bus connected to said virtual memory area and said processor means; and an address control means, connected to said address bus, for selectively enabling said first and second memory areas to provide access by said processor means to said object and background data, said address control means enabling said second memory area when said processor means reads data from said virtual memory area, said address control means enabling said first memory area when said processor means writes object and background data to said virtual memory area.

2. A system according to claim 1, wherein said second memory area consists of said copy of said portion of said background data.

3. A system according to claim 1, wherein said address control means directs said processor means to read background data exclusively from said copy of said background data in said second memory area when said processor means performs a reading operation from said virtual memory area.

4. A system according to claim 1, wherein said address control means directs said processor means to write object and background data exclusively to said animation area in said first memory area when said processor means performs a writing operation to said virtual memory area.

5. A system according to claim 1, wherein said processor means uniquely identifies each of said first, second, and virtual memory areas by outputting corresponding unique address values upon high address lines to said address control means.

6. A system according to claim 1, wherein said address control means includes means for mapping said first and second memory areas in a one-to-one relation to each other with a single address on lower address lines of said address bus identify corresponding locations within said first and second memory areas.

7. A system according to claim 1, wherein said address bus comprises high and low address lines, said address control means enabling one of said first and second memory areas based on said high address lines, said address control means designating a particular address within an enabled one of said first and second memory areas based on said low address lines.

8. A system according to claim 1, further comprising a read/write line and high address lines connected between said processor and address control means, and chip select lines for connected between said address control means and said first and second memory areas, said address control means controlling said chip select lines based on said read/write and high address lines.

9. A system according to claim 1, wherein said second memory area includes a background shadow mask and said first memory area includes an object shadow mask, between consecutive image frames, said processor means writing a combined image of said background shadow mask and said object over said object shadow mask.

10. A system according to claim 1, further comprising a third memory area storing a transparency memory map containing a copy of said object data surrounded by transparent data, said object being positioned proximate a leading side of said transparency memory map, with respect to a direction in which said object moves during animation, said object being located remote from a trailing region of said transparency memory map, said trailing region containing transparent data values, said trailing region having a width equal to a predefined distance moved by said object between consecutive image frames.

11. A system according to claim 1, wherein said processor means includes means for defining a shadow mask in said first memory area surrounding the object, said processor means modifying said shadow mask between consecutive image frames, said defining means positioning said object adjacent a trailing edge of said shadow mask with respect to a direction of movement of said object, said object being preceded by a leading region containing background data, said leading region having a width equal to a predefined distance moved by said object between consecutive image frames.

12. A method for displaying an animated object moving across a background image, said method comprising the steps of:

defining a virtual memory area containing first and second memory areas;

storing a memory map in said first memory area containing background data defining a background image of a current image frame;

copying a portion of said background image from said current image frame to said second memory area before object data is written to said memory map, said copied portion of said background image corresponding to an animation region of said current image frame through which said object moves;

storing a transparency memory map, in a third memory area, said transparency memory map containing a copy of said object data surrounded by transparent data;

after said copying step, writing said object data to said first memory area over a portion of said background data;

forming a next consecutive image frame by reading, modifying and writing said object data and surrounding background data from and to said virtual memory area; and controlling access to said first and second memory areas by enabling said second memory area during a reading operation addressed to said virtual memory area and by enabling said first memory area during a writing operation addressed to said virtual memory area.

13. A method according to claim 12, wherein said controlling step further includes the step of disabling said first memory area when performing said reading operation addressed to said virtual memory area.

14. A method according to claim 12, wherein said controlling step further includes the step of disabling said second memory area when performing said writing operation addressed to said virtual memory area.

15. A method according to claim 12, further including the step of configuring said first, second, third and virtual memory areas to be uniquely identified by outputting corresponding unique address values.

16. A method according to claim 12, further comprising the step of mapping said first and second memory areas in a one-to-one relationship to each other, such that an address in said virtual memory area corresponds to a same address in said first and second memory areas.

17. A method according to claim 12, further comprising the steps of:

enabling one of said first, second and third memory areas based on a value of higher address lines from an address bus; and designating a particular address within an enabled one of said first, second and third memory areas based on a value of lower address lines from said address bus.

18. A method according to claim 12, further comprising the step of controlling chip select lines for said first and second memory areas based on an output of a read/write line and higher address lines.

19. A method according to claim 12, further comprising the steps of:

defining a background shadow mask within said second memory area and an object shadow mask within said first memory areas, and between consecutive image frames, writing a combined image of said background shadow mask and said transparency memory map from said third memory area over said object shadow mask in said first memory area.

20. A method according to claim 12, further comprising the step of forming said transparency memory map with said object positioned nearest a leading side thereof, with respect to an animation direction of said object, and followed by a trailing region containing transparent data values, said trailing region having a width equal to said predefined distance moved by said object between consecutive image frames.

21. A method according to claim 12, further comprising the step of forming a shadow mask surrounding the object as an area to be modified between consecutive image frames, said object being positioned adjacent a trailing side of said shadow mask with respect to a direction of movement of said object, and preceded by a leading region containing background image, said leading region having a width equal to said predefined distance moved by said object between consecutive image frames.

* * * * *